(12) United States Patent
Wang et al.

(10) Patent No.: US 9,460,120 B2
(45) Date of Patent: Oct. 4, 2016

(54) TRAVEL ROUTE PLANNING USING GEO-TAGGED PHOTOGRAPHS

(75) Inventors: Changhu Wang, Beijing (CN); Jiang-Ming Yang, Beijing (CN); Lei Zhang, Beijing (CN); Xin Lu, Tianjin (CN)

(73) Assignee: Microsoft Licensing Technology, LLC, Redmond, WA (US)

( * ) Notice: Subject to any disclaimer, the term of this patent is extended or adjusted under 35 U.S.C. 154(b) by 561 days.

(21) Appl. No.: 12/896,635

(22) Filed: Oct. 1, 2010

(65) Prior Publication Data
US 2012/0084000 A1 Apr. 5, 2012

(51) Int. Cl.
*G01C 21/00* (2006.01)
*G06F 17/30* (2006.01)
*G01C 21/34* (2006.01)
*G01C 21/36* (2006.01)

(52) U.S. Cl.
CPC ....... *G06F 17/30265* (2013.01); *G01C 21/343* (2013.01); *G01C 21/3476* (2013.01); *G01C 21/3484* (2013.01); *G01C 21/3647* (2013.01); *G06F 17/30056* (2013.01)

(58) Field of Classification Search
CPC .. G01C 21/3647; G01C 21/28; G01C 21/32; G01C 21/00; G01C 21/3423; G01C 21/343; G01C 21/3476; G01C 21/3484
USPC ........................................................ 701/516
See application file for complete search history.

(56) References Cited

U.S. PATENT DOCUMENTS

| | | | |
|---|---|---|---|
| 6,289,270 B1* | 9/2001 | Baumgarten | 701/26 |
| 7,188,085 B2* | 3/2007 | Pelletier | 705/50 |
| 7,257,589 B1* | 8/2007 | Hull et al. | 707/608 |
| 2002/0112237 A1* | 8/2002 | Kelts | 725/39 |
| 2005/0216464 A1* | 9/2005 | Toyama et al. | 707/9 |
| 2007/0067104 A1* | 3/2007 | Mays | 701/211 |
| 2007/0143014 A1* | 6/2007 | Sekine et al. | 701/211 |
| 2008/0125969 A1* | 5/2008 | Chen et al. | 701/211 |
| 2008/0204317 A1 | 8/2008 | Schreve et al. | |
| 2008/0297855 A1* | 12/2008 | Silverbrook et al. | 358/473 |

(Continued)

FOREIGN PATENT DOCUMENTS

WO WO/2010045143 * 4/2010

OTHER PUBLICATIONS

Hao, et al., "Equip Tourists with Knowledge Mined from Travelogues", retrieved on Aug. 2, 2010 at <<http://research.microsoft.com/pubs/121309/traveloguemining_www2010.pdf>>, ACM, Proceedings of International World Wide Web Conferenc (WWW), Raleigh, North Carolina, Apr. 30 2010, pp. 401-410.

(Continued)

*Primary Examiner* — Redhwan K Mawari
(74) *Attorney, Agent, or Firm* — Sandy Swain; Micky Minhas

(57) ABSTRACT

Systems, methods, and devices are described for providing customized trip plans. Based on information provided by a user, geo-tagged photographs, and/or travelogues, one or more travel destinations are identified. Travel paths typically taken by tourists within each of the travel destinations and stay times within those travel destinations may be determined. A customized trip plan including a travel route plan among the one or more travel destinations and recommended internal paths within each travel destination are provided to the user. A revised customized trip plan may also be provided in response to changes made to information associated with the user.

20 Claims, 7 Drawing Sheets

(56) References Cited

U.S. PATENT DOCUMENTS

| | | |
|---|---|---|
| 2009/0143977 A1 | 6/2009 | Beletski et al. |
| 2009/0171579 A1* | 7/2009 | Wu et al. ............... 701/211 |
| 2009/0210143 A1* | 8/2009 | Seltzer et al. ............ 701/200 |
| 2009/0210146 A1 | 8/2009 | Chen |
| 2009/0313679 A1 | 12/2009 | McAfee et al. |
| 2010/0010734 A1 | 1/2010 | Liu |
| 2010/0070613 A1* | 3/2010 | Chen et al. ............... 709/219 |
| 2010/0305844 A1* | 12/2010 | Choi et al. ............... 701/201 |
| 2011/0276915 A1* | 11/2011 | Freire et al. ............. 715/772 |
| 2012/0084000 A1* | 4/2012 | Wang et al. ............. 701/426 |

OTHER PUBLICATIONS

Hile, et al., "Landmark-Based Pedestrian Navigation from Collections of Geotagged Photos", retrieved on Aug. 2, 2010 at <<http://research.nokia.com/files/hile_landmark_mum08.pdf>>, ACM, Proceedings of International Conference on Mobile and Ubiquitous Multimedia (MUM), Umea, Sweden, Dec. 2008, pp. 145-152.

* cited by examiner

TRAVEL ROUTE PLANNING USING GEO-TAGGED PHOTOGRAPHS

BACKGROUND

Choosing a travel destination and then planning a travel route is often an important first step for a tourist when planning and preparing for a trip. Prior to leaving for a trip, a tourist may have several travel-related questions, such as questions relating to travel destinations, which attractions to visit, the most popular travel paths within an attraction, and a recommended itinerary for visiting one or more attractions, among many others. Historically, a tourist could answer some of these questions by word of mouth, by visiting a travel agent, and/or by reading travel guides associated with the region the tourist is traveling. However, such techniques are time-consuming and the resources may not provide sufficient information for the tourist to plan a trip based on his or her travel preferences.

With the emergence of the Internet, individuals now have access to a wealth of travel information, such as online travel guides, web-based communities, and travelogues and uploaded photographs describing and illustrating travels experienced by other tourists. Although a tourist may search for travel information using the above resources and/or ask questions in web-based communities, these efforts generally prove to be inefficient and the information provided will likely not be customized to that particular tourist. Reading travelogues one at a time may provide valuable travel information, but since each travelogue records only individual footprints of a particular trip, it can be time-consuming to manually summarize multiple travelogues and identify a travel route that satisfies user preferences. For instance, the tourist who authored the travelogue may have completely different travel preferences than the reader. Moreover, as the information provided in travelogues can be unstructured and may vary from person to person and from language to language, the travelogues may be extremely difficult for a tourist to follow.

SUMMARY

Described herein are techniques for automatic and interactive trip planning according to individual preferences. In one embodiment, a system includes a destination discovering component that is configured to identify one or more destinations based on geo-tagged photographs. The system may also include an internal path discovering component that is configured to determine one or more internal paths within one of the destinations. Also included within the system may be a trip planning component that is configured to generate one or more travel route plans among the identified destinations based on various factors, such as, for example, a location of the destinations, travel duration, available visiting time at each destination, and travel preferences of an individual. In additional embodiments, the system described above enables an individual to interactively revise a travel route plan generated by the trip planning component based on an update and/or addition to his or her travel preferences.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Described herein are systems and techniques for providing automatic and interactive trip planning. In one embodiment, the system described herein may access publicly available geo-tagged photographs that have been uploaded to various sources, such as the Internet, and/or travelogues maintained on the Internet. As these geo-tagged photographs and/or travelogues serve as footprints of tourists at memorable travel destinations throughout the world, the geo-tagged photographs and/or travelogues may be used to discover popular travel destinations, such as attractions and/or landmarks, travel paths within a particular travel destination, and travel routes between the travel destinations. Based on information discovered from the geo-tagged photographs and/or travelogues, the above systems and techniques may generate and provide a customized trip plan for a tourist.

As stated above, it may be difficult and time-consuming for a tourist to individually accumulate, review, and summarize the large amount of travel information, such as geo-tagged photographs and travelogues, available on the Internet. Therefore, to create a more efficient and user-friendly travel planning experience, a tourist may provide to the system specific travel information. Such travel information may include information relating to desired travel location, travel duration, visiting time at each destination, a travel budget, destination preferences, and various personal information, such as, for example, physical condition, age, and individual interests. Based on this information, the system described herein may automatically generate a customized travel plan that accounts for the input associated with that particular user. Subsequently, the system may enable a user to interactively adjust any part of the suggested travel plan if the user either decides to adjust his or her travel/personal preferences or if the user has any requirements that the suggested travel plan does not satisfy. In response, the system may generate a revised travel plan that attempts to meet the user's preferences.

Various examples of generating travel plans in accordance with the embodiments are described below with reference to FIGS. 1-6.

Figure 1:
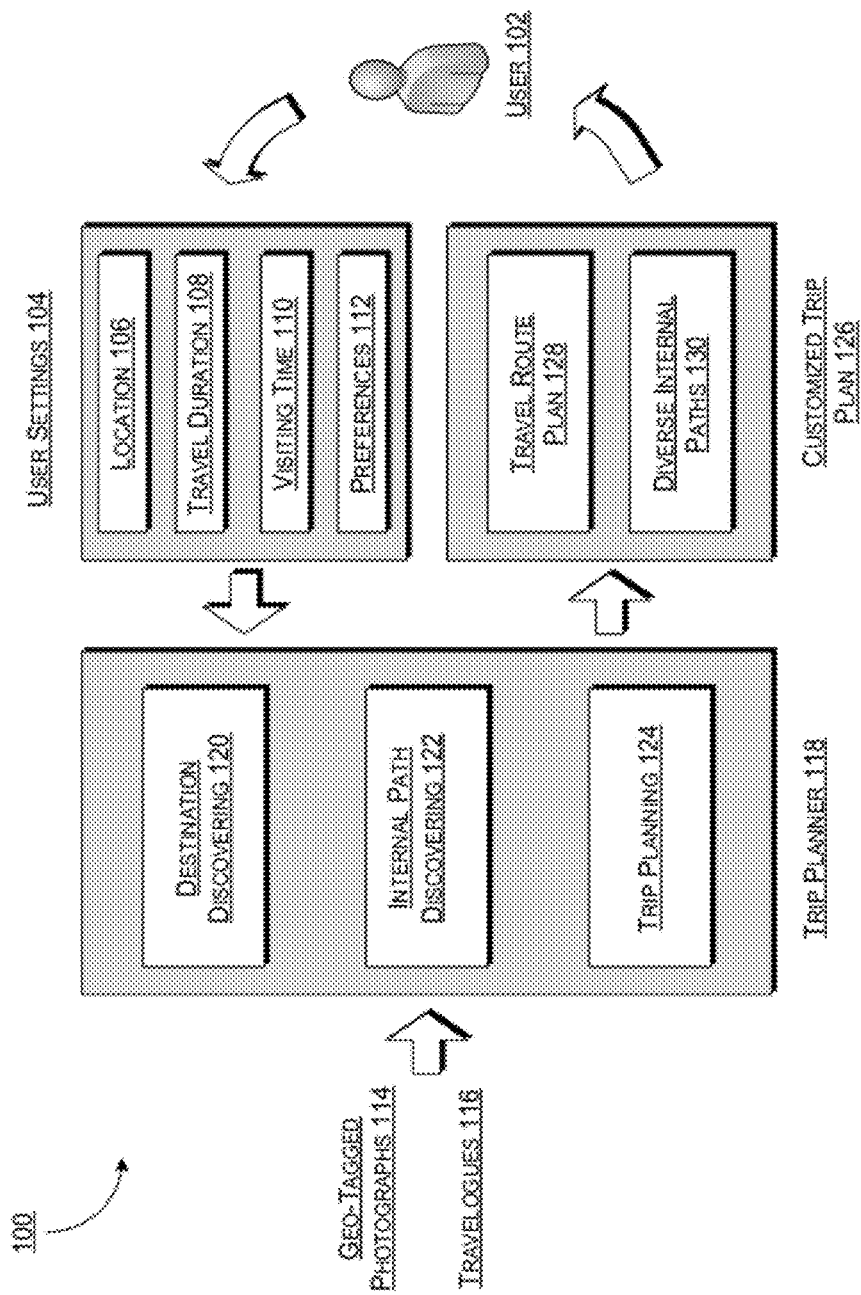
FIG. 1 illustrates a diagram showing a system for automatic and interactive trip planning, in accordance with various embodiments.

FIG. 1 illustrates a diagram representing a system 100 for generating one or more customized travel plans for a user. System 100 includes a user 102, a user settings component 104, a trip planner component 118, geo-tagged photographs 114 and travelogues 116, and a customized trip plan 126 that is output to user 102. In one embodiment, user 102 may desire to plan a trip but would like to avoid needing to conduct extensive research regarding a travel destination and a travel plan. Accordingly, user 102 may access the user settings 104 component of system 100. User settings component 104 of system 100 includes a location setting 106, a travel duration setting 108, a visiting time setting 110, and a preferences setting 112. Using the user settings component 104 of system 100, user 102 may enter information relating to a location of where user 102 would like to travel, an amount of time that user 102 is able to travel, the amount of time user 102 would like to spend at each destination, and any travel preferences the user 102 may have. Moreover, it is contemplated that user 102 may also be interchangeably referred to as tourist, traveler, and/or individual.

For the purposes of this discussion, destination or travel destination may refer to any places, such as attractions, sights, or landmarks within a town, city, or region that a tourist may travel. If an attraction or landmark is only an individual building or landmark, such as the Space Needle located in Seattle, Wash., the destination may also include certain regions outside it from which tourists could also enjoy traveling to this building or landmark.

In various embodiments, geo-tagged photographs 114 may include any photograph taken within a travel destination and may represent footprints of tourists at such travel destinations. That is, the geo-tagged photographs 114 may identify sights visited and paths taken within a particular destination. Further, the geo-tagged photographs 114 may encode rich travel-related information including a time and location, such as a latitude/longitude pair, that the geo-tagged photographs 112 were taken at a particular destination. Moreover, these geo-tagged photographs 114 are typically publically available on the Internet and may represent places, attractions, and landmarks throughout the world. On the other hand, travelogues 116 may refer to a piece of writing describing or relating to various travels, such as a trip taken by a tourist or a specific travel destination visited. Travelogues 116 may or may not be authored by the traveler and may also be publicly accessible over the Internet.

The trip planner component 118 of system 100 may access geo-tagged photographs 114 and/or travelogues 116 from any number of sources. For instance, the geo-tagged photographs 114 and travelogues 116 may be obtained from publicly-accessible Internet websites or other resources. As shown in FIG. 1, trip planner component 118 includes destination discovering module 120, internal path discovering module 122, and trip planning module 124. In various embodiments, destination discovering module 120 may use information provided by user 102 and the geo-tagged photographs 114 and/or travelogues 116 to discover and identify worldwide travel destinations that may be of interest to user 102. For example, destination discovering module 120 may identify travel destinations having characteristics that would be consistent with the user's 102 preferences by mapping geo-tagged photographs 114, travelogues 116, and preferences selected by user 102 to worldwide travel destinations.

Upon the destination discovering module 120 identifying one or more travel destinations, internal path discovering module 122 may determine one or more paths within one or more of the identified travel destinations. Such paths may also be referred to popular paths, internal paths, or travel paths within the travel destination. In various embodiments, the paths may be determined by first identifying geo-tagged photographs 114 taken by one or more other users within a particular travel destination. By knowing the location and time such geo-tagged photographs 114 were taken, internal path discovering module 122 may reconstruct paths, also referred to as incomplete paths, taken by the other users within that particular travel destination. The reconstructed paths may be referred to as incomplete since geo-tagged photographs 114 associated with a first user may represent only a portion of the travel destination. In other words, if the first user took and uploaded geo-tagged photographs 114 of only a first half of the travel destination, it would be difficult to reconstruct the first user's path in the second half of that travel destination. In addition, the internal path discovering module 122 may further merge the reconstructed incomplete paths to determine the one or more internal paths. Additional explanation with respect to the reconstructing and the merging performed by the internal path discovering module 122 will be subsequently discussed in relation to FIG. 2.

In an example embodiment, having knowledge of an internal path of a particular travel destination may allow system 100 to guide a user 102 to walk and take photographs along the most attractive paths within that travel destination. Such internal paths may also provide a more complete footprint within each travel destination. Furthermore, identifying the internal paths may also assist system 100 in determining the amount of time to spend within a particular travel destination (i.e., "stay time"), which may be used by trip planning module 124.

Trip planning module 124 of trip planner component 118 may utilize information provided by the user 102 to the user settings component 104 to generate travel route plans, also referred to as routes, among the travel destinations identified by the destination discovering module 122. That is, trip planning module 124 may consider travel location 106, travel duration 108, visiting time 110, and other user preferences 112 to suggest or recommend a customized trip plan 126 to user 102. The suggested customized trip plan 126 may not only suggest multiple travel destinations and routes between those travel destinations, but may also provide detailed travel information for each travel destination, including representative travel paths and stay times within each destination. For the purposes of this discussion, a travel route represents a sequence of destinations to be visited by user 102. Moreover, the travel route together with the typical stay time and travel path within each destination along this route results in a trip plan for user 102.

As stated above, the customized trip plan 126 may include a travel route plan 128 describing a route to travel between a plurality of travel destinations and diverse internal paths 130, which may be popular, typically traveled, and/or suggested paths within a travel destination. A finalized customized trip plan 126 generated by the trip planner component 118 may be presented to user 102. Subsequently, user 102 may accept the generated customized trip plan 126 or update its user settings 104, thus causing the trip planner component 118 to generate a revised customized trip plan 126 based on the user's 102 updated user settings 104. Upon receiving a finalized customized trip plan 126, user 102 may choose to utilize the customized trip plan 126 when traveling to his or her travel destination of choice.

As mentioned previously, user 102 may provide various types of information to user settings component 104, which includes a location setting 106, a travel duration setting 108, a visiting time setting 110, and a preferences setting 112. In various embodiments, the location setting 106 refers to a destination in which user 102 desires to travel (i.e., Beijing, Paris, or New York). The travel duration setting 108 relates to an amount of time user 102 will be traveling (i.e., three days or two weeks). Moreover, the visiting time setting 110 refers to a time of year in which user 102 will be traveling (i.e., summer, winter, March, October, etc.). Lastly, the preferences setting 112 may relate to destination preferences, meaning characteristics associated with the type of travel destinations that user 102 prefers to visit. For instance, user 102 may specify whether he/she prefers to visit historic sites or more natural, scenic destinations. Furthermore, the user 102 may indicate whether he/she prefers rural or more urban destinations and/or destinations with warmer or colder climates.

It is also contemplated that any type of travel preferences related to user 102 may be included in the preferences setting 112. Additional information relating to user 102 that could be provided to the user settings component 104 could include a travel budget, age, physical condition, trips previously taken and destinations previously traveled to, the purpose of the trip (i.e., relaxation, activities-based, night life, food, etc.), types of activities that user 102 likes and/or dislikes, a desired frequency of moving from one destination to another destination, and the preferences of other individuals who will accompany user 102 when traveling. However, the foregoing list is non-exhaustive and may include any other individual interests and/or preferences of user 102.

As mentioned previously, the destination discovering module 120 of trip planner component 118 is configured to identify one or more travel destinations using geo-tagged photographs 114 and/or travelogues 116 and being based on information provided by user 102 to user settings component 104. It is also contemplated that the destination discovering module 120 may use any other information in addition to geo-tagged photographs 114 and travelogues 116 to identify the one or more travel destinations. Moreover, the travel destinations may be determined based on a location of the geo-tagged photographs 114, such as a latitude and a longitude identifying where the geo-tagged photographs 114 were taken.

In various embodiments, once a plurality of geo-tagged photographs 114 have been identified by destination discovering module 120, any type of clustering algorithm may be used to cluster the geo-tagged photographs 114 into a number of clusters. Each cluster may be based on the location of the geo-tagged photographs 114 contained within that cluster. For instance, a number of geo-tagged photographs 114 that are encoded with a location in or around Paris may be clustered into a first cluster whereas geo-tagged photographs 114 that are encoded with a location in or around Seattle may be clustered into a second, different cluster. To determine travel destinations that may be of interest to user 102, the destination discovering module 120 may then reduce the number of clusters. For example, the destination discovering module 120 may select a certain number or percentage, such as 10%, of the biggest clusters that are then preserved and considered as travel destinations. The rationale being that clusters having a larger number of geo-tagged photographs 114 are likely to represent travel destinations in which tourists took more photographs. As such, these cities or regions are likely to be popular or highly visited tourist destinations.

Following the destination clustering, each travel destination is represented by a set of geo-tagged photographs 114 without a destination name. Therefore, in some embodiments, the destination discovering module 120 may associate each travel destination with a textual name (Paris, Grand Canyon, etc.). A gazetteer may be used to determine names for each of the selected travel destinations. For the purposes of this discussion, a gazetteer is a geographical dictionary or directory that is a reference for information about various places and place names used in conjunction with a map or an atlas. The name of each travel destination may then be determined by the gazetteer together with location popularity information mined from the travelogues 116. In the gazetteer, each travel destination name is associated with a center coordinate (represented by a latitude and a longitude) of this travel destination. Therefore, the destination discovering module 120 may name each geo-tagged photograph 114 cluster based on a distance between a cluster center, which is based on the location data contained in the geo-tagged photographs 114, and the coordinate of the travel destination name. If there are multiple destination names that match a particular cluster, the destination discovering module 120 may select the most popular name contained in the plurality of travelogues 116.

Additionally, in order to generate the customized trip plan 126, the destination discovering module 120 may associate each travel destination with a user's 102 potential preferences, such as destination style and visiting time 110, for example. Destination style and visiting time 110 are merely examples of a user's 102 potential preferences and any information provided by user 102 to the user settings component 104 may be considered when creating the customized trip plan 126.

With respect to destination style, such as whether user 102 prefers visiting travel destinations having historic sites, distinct food, or beautiful scenery, for example, destination discovering module 120 may mine the top style terms for each travel destination based on the plurality of travelogues 116. The destination discovering module 120 may then be able to determine characteristics associated with each travel destination.

Each travel destination may also have a time of the year in which more tourists typically visit that travel destination. For instance, tourists may commonly visit Phoenix, Ariz. during the winter months since temperatures reach high levels during the summer. On the contrary, more tourists may tend to visit Anchorage, Ak. during the summer when the temperatures are milder and the days receive additional hours of sunlight. The destination discovering module 120 may estimate the popular or most common visiting times for each travel destination by determining the number of tourists that visit each travel destination in each time period (July, Winter, etc.).

In an example embodiment, the internal path discovering module 122 may determine typical paths and stay times within the one or more travel destinations identified by destination discovering module 120. However, as stated above, the functions performed by the internal path discovering module 122 will be subsequently discussed in relation to FIGS. 2-4.

The trip planning module 124 of trip planner component 118 may provide suggested travel routes between or among travel destinations and representative internal paths within each travel destination that have been determined by internal path discovering module 122. For instance, assume user 102 intends to visit Beijing, China for one day. In an example embodiment, the trip planning component 124 may generate a customized trip plan 126 that includes a suggested travel route of (1) three hours in the Forbidden City, (2) two hours in Tian An Men Square, and (3) two hours in Qianmen, in that order. Furthermore, the customized trip plan 126 may also identify internal paths within each of these attractions that tourists typically take and a recommended stay time that represents a suggested amount of time that user 102 should spend in each attraction. For the purposes of this discussion, a route represents a sequence of travel destinations that may be visited by user 102. The travel route together with the typical stay time and travel path within each travel destination results may constitute a customized trip plan 126 for tourists, such as user 102.

As shown in FIG. 1, the customized trip plan 126, which includes a travel route plan 128 and diverse internal paths 130 within each travel destination, may be interactively updated and changed by user 102. In various embodiments, the customized trip plan 126 provided to user 102 may be updated based on additional information provided by user 102 to user settings component 104 (i.e., an additional travel preference) and/or changes to information previously provided to user settings component 104. For instance, user 102 may decide to update its travel preferences, add, remove or change an interested/uninterested travel destination (i.e., from Seattle, Wash. to Chicago Ill.) and/or adjust the stay time at each travel destination (i.e., from three days to a week). In response to this information, the trip planning module 124 may update the customized trip plan 126, either automatically or not, and provide the revised customized trip plan 126 to user 102. The revised customized trip plan 126 should reflect and be consistent with the travel-related preferences and information specified by user 102.

In an example embodiment, in order to formulate the customized trip plan 126, trip planning module 124 may need to answer a variety of questions. For example, trip planning module 124 may need to determine (1) how to choose attractions typically visited in a travel destination, (2) how to order the selected attractions during the trip, (3) how to manage the stay time in each attraction, and/or (4) how to take into account a user's 102 travel preferences. It is contemplated that the above four questions may be related to one another and may not be easily solved separately. For example, the trip planning module 124 may need to consider the typical visiting time of each attraction within the travel destination when particular travel destinations are recommended. That is, if a user 102 has only five hours to visit two attractions of interest, it might be improper to recommend to user 102 a route which took previous tourists eight or more hours to complete.

In order to answer one or more of the foregoing questions and to generate a customized trip plan 126 for a user 102, trip planning module 124 may utilize a graph analysis technique and a dynamic programming algorithm. Using such techniques, the attractions within each travel destination may correspond to nodes (V) on a directed graph (G(V, E)), and a transition between one attraction to another attraction within the travel destination corresponds to the transition(s) on the graph. Therefore, it can then be determined how to find an optimal path on the graph G(V, E), along which a total score is maximized subject to the constraint that the total time cost is less than or equal to a travel duration 108 provided by user 102. In the following paragraphs, how to dynamically construct the directed graph G(V, E) according to preferences provided by user 102 and then how to apply dynamic programming on the graph to generate customized trip plans 126 will be discussed.

With respect to dynamic graph construction of graph G(V, E), each attraction within the travel destination is split into several nodes according to the typical stay times that are determined. For instance, if the typical stay times at a particular attraction within the travel destination are two hours, three hours, and four hours, with stay time probabilities of 0.4, 0.5, and 0.1, respectively, there will be three nodes which contain a different stay time property. As having additional nodes for an attraction will likely lead to additional time cost, the trip planning module 124 may only consider stay times when their respective probabilities normalized by a maximal probability are higher than a predetermined probability, such as 0.6. However, it is contemplated that any threshold may be used by trip planning module 124.

In one embodiment, each node $v_i$ in graph G=(V, E) may have three attributes. The three attributes include the stay time $t_i$, the node score $s_i$, and $dest_i$, where $t_i$ is the stay time within a particular attraction and $s_i$ is determined by four factors: destination popularity $S_{pop}$, stay time weight $w_i$, destination style preference score $S_{dsp}$, and visiting time preference score $S_{vtp}$. $dest_i$ is the attraction which node $v_i$ represents and it is contemplated that two nodes may represent the same attraction within the travel destination with different stay times.

Destination popularity $S_{pop}$ is the number of tourists who have visited this particular attraction within the travel destination based on historical records, the stay time weight $w_i$ is the stay time probability normalized by a maximal one, and the destination style preference score $S_{dsp}$ is the probability of the style term given the particular attraction within the travel destination. The trip planning module 124 may create a monthly statistic for the visiting time preference score $S_{vtp}$, which considers both an absolute number of tourists at an attraction in a particular month and a ratio of the number tourists traveling to that attraction in that month to the total number of tourists that visited that attraction. Moreover, a score of node $v_i$ may be defined as:

$$s_i = (S_{pop} + \alpha S_{vtp} + \beta S_{dsp}) \times w_i, \quad (1)$$

where $\alpha$ and $\beta$ are two parameters to make $S_{vtp}$, $S_{pop}$, and $S_{dsp}$ have the same scale, which are both practically set to be a certain integer.

Moreover, for each pair of nodes $v_i$ and $v_j$, the trip planning module 124 makes an edge $e_{ij}$ to connect the two nodes. The edge $e_{ij}$ has two attributes: an edge score $s_{ij}$ and passing time $t_{ij}$ between $v_i$ and $v_j$. In this embodiment, the edge score $s_{ij}$ is equal to the number of people who have sequentially visited $dest_i$ and $dest_j$ in a single trip. For instance, for a historical trip A→B→C→D, the occurrence of tuples (A, B), (B, C), (C, D), (A, C), (B, D), and (A, D) are counted. The passing time $t_{ij}$ may be computed and the edges with zero scores may be removed from the graph.

In addition, given graph G(V,E) and travel duration T specified by user 102, the trip planning module 124 may determine how to find the optimal path (in terms of total score of nodes and edges) with time cost (total stay and passing time of nodes and edges) less than or equal to T. To determine the optimal path between attractions within a travel destination, trip planning module 124 may calculate the scores of the paths between all pairs of nodes given t=step≤T and then calculate these scores given the time t=(step+step)≤T. The calculation will be finished when t<T and t+step>T.

To further clarify the above calculations, the function $f(v_i, v_j, t_i)$ may be used to denote the score of the optimal route between nodes $v_i$ and $v_j$, with the time cost on the route being less than or equal to t. For instance, $R^t_{ij}$ may refer to the set of nodes on the route and the goal would be to compute $f(v_i, v_j, T)$ for every $v_i$ and $v_j$ and then choose the best several routes to suggest to user 102. In various embodiments, this can be performed by the dynamic programming algorithm discussed below.

In various embodiments, assume for all t', t-step, the score function $f(v_i, v_j, t')$ is already known. Accordingly, the optimal score of $f(v_i, v_j, t)$ can be decomposed into the computation of two sub-problems of $f(v_i, v_j, t')$ and $f(v_i, v_j, t-t'-t_k)$. Computing the above function has an optimal substructure and overlapping sub-problems, and can be solved by applying dynamic programming. For instance:

$$f(v_i, v_j, t) = \max_{\substack{v_k \in V, t' \le t \\ R^{t'}_{ij} \cap R^{t''}_{ij} = \{dest_k\}}} f(v_i, v_j, t') + f(v_i, v_j, t'') - sk \quad (2)$$

where $t''=t-t'-t_k$, and $$R^t_{ij} = R^{t*}_{ik*} \cup R^{t-t*-tk}_{k*j} \cup \{dest_{k*}\},$$

Where $v_{k*}$ and $t^*$ make equation (2) the maximum value. In this embodiment, $dest_k$ is recorded into $R^t_{ij}$ to avoid repeatedly visiting the same attraction within the travel destination, as shown in equation (3).

In the above implementation, the trip planning module 124 may initialize the graph in the following manner. $R^t_{ij}=\{i, j\}$ is set for all $e_{ij} \in E$, and for all $t \ge 0$, there is:

$$f(v_i, v_j, t) = \begin{cases} s_i + s_j + s_{ij}, & e_{ij} \in E, t \ge t_{ij}, dest_i \ne dest_j \\ -\infty, & \text{otherwise} \end{cases} \quad (4)$$

where $t=t_i+t_j+t_{ij}$. After the score matrix is initialized, the dynamic programming algorithm set forth above is applied to calculate the maximal score for each pair of two nodes within travel duration T. The time complexity of the above algorithm is $O(|V|^3(T/step)^2)$, where step may be set to any time period, such as one hour.

In an example embodiment, a system may include a destination discovering component, an internal path discovering component, and a trip planning component. The destination discovering component may be configured to identify a plurality of destinations based at least in part on one or more geo-tagged photographs and/or one or more travelogues. The geo-tagged photographs and travelogues may refer to the geo-tagged photographs 114 and travelogues 116, respectively, as discussed herein. Moreover, the destination discovering component may further be configured to crawl a plurality of web albums to collect the one or more geo-tagged photographs 114 and/or travelogues 116, to group the geo-tagged photographs 114 into one or more clusters each corresponding to a different destination based on a geographic location of the geo-tagged photographs 114, and to use the travelogues 116 and the geographic location of the geo-tagged photographs 114 to name each of the destinations. In addition, the destination discovering component may also be configured to associate each destination with potential user-preferences, which are discussed above in reference to FIG. 1. Example user-preferences may include a destination style describing attributes associated with each destination and/or a popular visiting time of each destination determined by a number of tourists who visited each destination in different time periods. However, as stated above, any preference or information relating to a particular individual may be included within the definition of user-preferences.

The trip planning component may be configured to generate one or more travel route plans among the plurality of destinations. The travel route plans may include one or more of the plurality of destinations based on associations of user preferences with information about the plurality of destinations. For instance, the trip planning component may compare preferences of a user to characteristics associated with the plurality of destinations to determine destinations that may be of interest to the user. Therefore, the travel route plans may be customized according to likes and dislikes of a user. In various embodiments, the travel route plans may include a travel route between each of the travel destinations, including a recommended internal path and a stay time within each travel destination. The aforementioned travel route plan may be customized based on a plurality of factors associated with a user, such as, for example, travel duration, visiting time at each destination, destination preference, monetary budget limitations, travel preferences, destination location, and a season of travel. Further, the trip planning component may be configured to enable an individual to interactively change a particular travel route plan based on adding, removing, or changing individual preferences. As stated previously, the trip planning component may be configured to send a revised travel route plan to a user in response to a user updating his/her general information and/or travel preferences.

Moreover, the internal path discovering component may be configured to determine one or more paths within at least one of the plurality of destinations. In one embodiment, the one or more paths within the at least one destination that is included in the travel route plan may be based on individual paths generated from the plurality of geo-tagged photographs 114. The internal path discovering component may further be configured to identify geo-tagged photographs 114 taken at the least one destination that are associated with two or more different individuals and to determine a path taken by each individual within the at least one destination based on the geo-tagged photographs 114 associated with each individual. As described herein, since each individual may not have taken and uploaded geo-tagged photographs 114 representative of the entire path taken within the travel destination, the determined paths may appear to be incomplete. The internal path discovering component may also merge the paths associated with the two or more individuals to reconstruct a complete path within the at least one destination. In addition to reconstructing the complete path, the internal path discovering component may also be configured to determine a stay time for each path and for the complete path, whereby the stay time corresponds to an estimated total time spent within the at least one destination.

Figure 2:
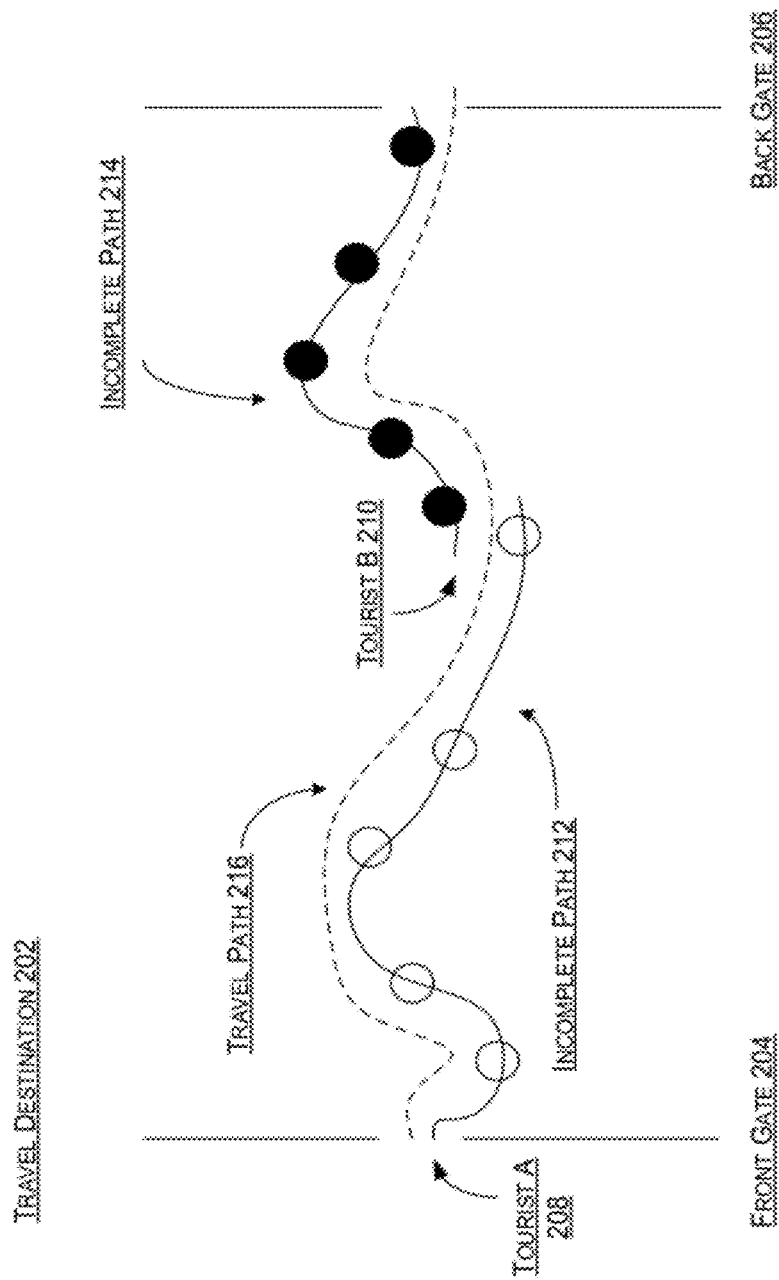
FIG. 2 illustrates a diagram showing merging incomplete paths taken by different users at a travel destination into a single travel path, in accordance with various embodiments.

FIG. 2 illustrates a diagram showing generating an internal path at a particular travel destination based on paths previously taken by other tourists. In one embodiment, the features illustrated in FIG. 2 may be performed by internal path discovering module 122. As stated previously, internal path discovering module 122 may discover popular or commonly-traveled paths within a travel destination and determine various stay times, or the time typically spent by tourists, within a travel destination. Both the internal paths and the stay times within a particular travel destination may be determined by observing behavior of tourists who have previously visited that travel destination. For the purposes of this discussion, paths taken by one or more tourists who have previously visited a travel destination may be referred to as individual or incomplete paths whereas a merged and/or recommended path determined from the individual paths of various tourists may be referred to as the internal or travel path.

As tourists visit a particular travel destination, tourists may take photographs of the various sights and attractions within that travel destination. As stated above, such photographs may include geo-tagged photographs 114 that encode a variety of travel-related information. Therefore, the path taken by a particular tourist within a travel destination may be determined from the geo-tagged photographs 114 he/she has taken and uploaded to, for example, the Internet. Although the geo-tagged photographs 114 of a tourist may reveal the path the tourist took within the travel destination, this path may be far from the actual path the tourists walked along within this destination. Therefore, the path based on the geo-tagged photographs 114 may be considered an incomplete path because tourists usually take photographs at discrete positions while walking within the travel destination being visited. Moreover, a tourist may also choose to subsequently upload only a small portion of those photographs to their web albums.

To address the potential problem of being unable to reconstruct a complete path within a travel destination taken by a particular tourist, the internal path discovering module 122 may aggregate all the geo-tagged photographs 114 taken by multiple tourists within the same travel destination and determine one or more possible travel paths by merging the incomplete travel paths of the multiple tourists. More particularly, internal discovering module 122 may determine individual paths taken by the one or more tourists within a travel destination based on geo-tagged photographs 114 taken by the one or more tourists at the travel destination. Subsequently, each of the individual paths may be merged to form one or more recommended travel paths within that travel destination. FIG. 2 illustrates an example of the foregoing.

For the purposes of this discussion, assume that travel destination 202 is a tourist attraction that contains a front gate 204 and a back gate 206. In this embodiment, to visit travel destination 202 in its entirety, a tourist must begin at the front gate 204 and exit via the back gate 206. Further assume that travel destination 202 has been visited by two different tourists, tourist A 208 and tourist B 210, in which each have entered travel destination 202 through the front gate 204 and exited travel destination 202 through the back gate 206. Furthermore, although tourist A 208 and tourist B 210 both walked from the front gate 204 to the back gate 206, each only took and uploaded to their respective web albums five geo-tagged photographs 114 of travel destination 202. Geo-tagged photographs 114 taken and uploaded by tourist A 208 are represented by unfilled circles whereas geo-tagged photographs 114 taken and uploaded by tourist B 210 are represented by black circles. In this embodiment, each geo-tagged photograph 114 illustrated on FIG. 2 is representative of a location and time encoded within each geo-tagged photograph 114. As shown in FIG. 2, it appears that tourist A 208 took and uploaded geo-tagged photographs 114 of sights closer to the front gate 204 while tourist B 210 took and uploaded geo-tagged photographs 114 of attractions closer to the back gate 206. It is possible that tourist A 208 and tourist B 210 took additional photographs of travel destination 202, but these photographs were not uploaded and made publicly accessible to internal path discovering module 122.

Using only the geo-tagged photographs 114 uploaded by tourist A 208 and tourist B 210, it may be difficult to determine the complete walking path previously taken by both tourist A 208 and tourist B 210. For instance, based on the geo-tagged photographs 114 taken and uploaded by tourist 208A, internal path discovering module 122 may be able determine an incomplete path 212 taken by tourist A 208, which resembles a path from the front gate 204 to about midway through travel destination 202. However, since tourist A 208 did not upload any geo-tagged photographs 114 during the latter part of his/her visit to travel destination 202, it would be difficult to determine what type of path was taken from his/her last uploaded geo-tagged photograph 114 to the back gate 206. Likewise, internal path discovering module 122 may also determine, based on the geo-tagged photographs 114 taken and uploaded by tourist B 210, an incomplete path 214 taken by tourist B 210 that represents a potential path taken from about midway through travel destination 202 to the back gate 206. As with tourist A 208, however, since tourist B 210 only uploaded geo-tagged photographs 114 corresponding to the latter half of his/her individual path within travel destination 202, internal path discovering module 122 may be unable to determine tourist B's 210 path from the front gate 204 to the location associated with the first geo-tagged photograph 114 taken and uploaded by tourist B 210.

That is, based on the limited amount of geo-tagged photographs 114 taken and uploaded by tourist A 208 and tourist B 210 while visiting travel destination 202, internal path discovering module 122 may be unable to reconstruct complete paths within travel destination 202 for these tourists. However, by merging incomplete path 212 and incomplete path 214 associated with tourist A 208 and tourist B 210, respectively, internal path discovering module 122 may be able to reconstruct a travel path 216 mostly likely taken by these tourists from the front gate 204 to the back gate 206 of travel destination 202. In other words, internal path discovering module 122 may determine that tourist A 208 and tourist B 210 walked along the same or a similar path (travel path 216) within travel destination 202. As shown in FIG. 2, the travel path 216 is consistent with both of the incomplete paths determined for tourist A 208 and tourist B 210. Therefore, it is likely that these tourists walked along the same travel path 216 within travel destination 202.

Furthermore, in an example embodiment, an internal path discovering algorithm may be utilized to reconstruct a travel path 216 for a particular travel destination 202 based one or more incomplete paths. Before explaining how the internal path discovering algorithm may merge incomplete paths in order to generate a complete travel, or internal path, two path properties—path quality and path popularity—for merging incomplete paths and ranking travel paths will first be introduced.

Path quality may represent a degree to which an incomplete path, or a fragment thereof, approaches an ideal path. A fragment of an incomplete path may refer to a portion of the incomplete path between two different geo-tagged photographs 114 associated with that incomplete path. In this embodiment, an ideal path refers to a path along which a virtual tourist takes ands uploads geo-tagged photographs 114 at any time and position after he/she enters a travel destination. Accordingly, an ideal path should have an unlimited photo density and a relatively large span, meaning that a tourist could take as many photographs as he/she desires within that travel destination. Thus, photo density p(r) and path span l(r) are defined to describe the quality of a path r. Photo density p(r) may refer to the number of photographs per unit length on the path, and path span l(r) may refer to the maximum Euclidian distance between geo-coordinates of any two photographs on path r, which are given by the following two equations:

$$p(r) = \frac{\# \text{Photo in } r}{\sum_{i=1,\ldots,N-1} \text{Euclidian Distance } (I_i, I_{i+1})} \quad (5)$$

$$l(r) = \max_{I_i \in r, I_j \in r} \text{Euclidian Distance } (I_i, I_j), \quad (6)$$

Where $\{I_1, I_2, \ldots, I_N\}$ are the geo-tagged photographs 114 on path r with taken time $I_1 < I_2 < \ldots < I_N$. In various embodiments, incomplete paths, or fragments thereof, will likely have a limited photo density p(r) and a shrinked path span l(r). Therefore, the quality q(r) of a path r is defined as an increasing function of photo density p(r) and path span l(r).

Path popularity pop(r) may represent the popular degree of a travel path that previous tourists walked along within a particular travel destination, which may be defined by the number of tourists who have walked along that travel path. For a travel path generated by merging multiple incomplete paths, pop(r) is the number of incomplete paths, or fragments thereof, that generate the travel path.

Moreover, a final path score of path r may also be determined by internal path discovering module 122. The final path score of path r may be defined as a linear function of path quality and path popularity subject to the following constrains:

$$\lim_{p(r) \to \infty} s(r) = \text{pop}(r), \quad (7)$$

this means that if a path is an ideal path, only its popularity will be considered for its ranking. Therefore, the following two equations may be used to calculate path quality q(r) and path score s(r):

$$q(r) = 1 - \exp\{-l(r)p(r)\}. \quad (8)$$

$$s(r) = \text{pop}(r) + q(r) - 1. \quad (9)$$

Figure 3:
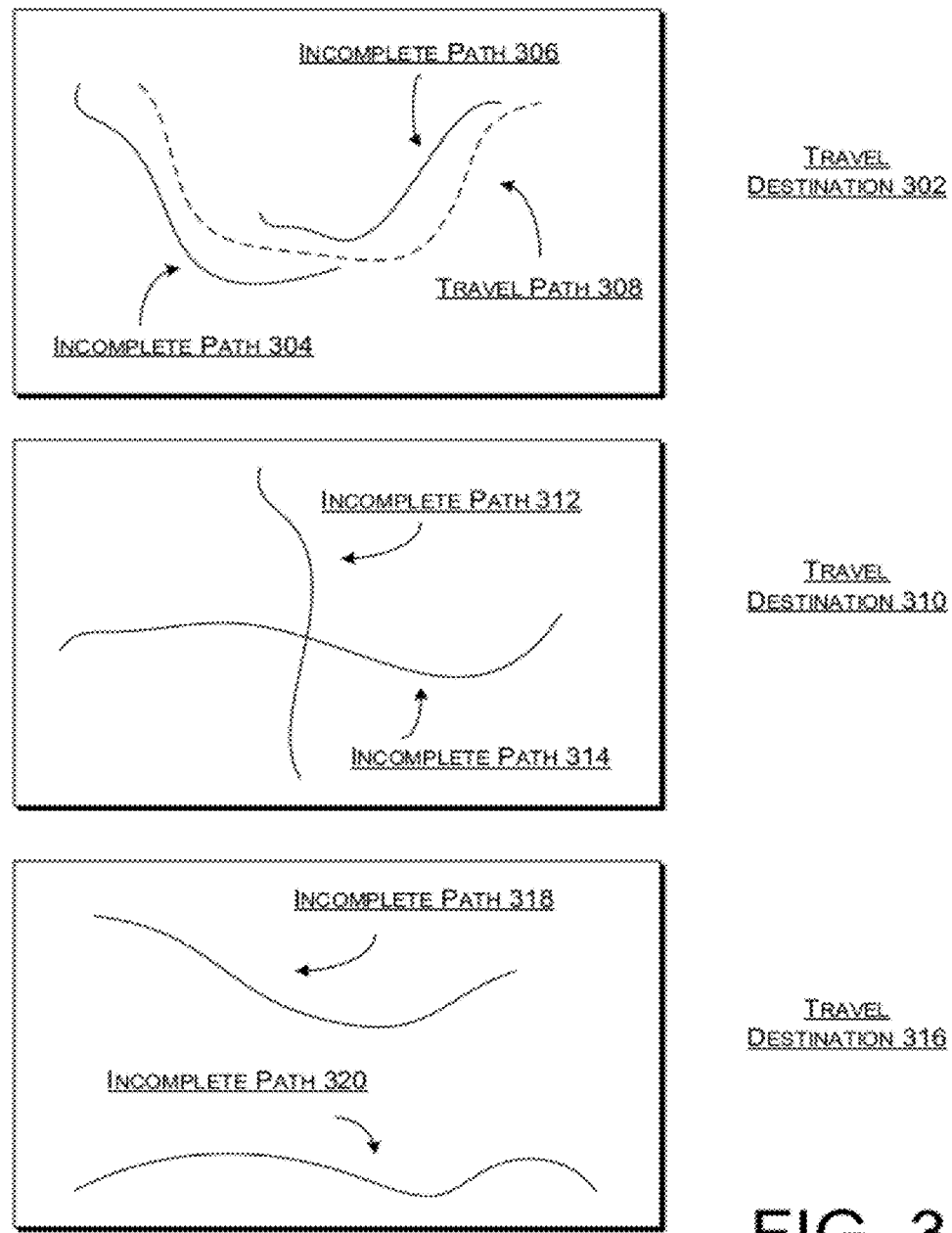
FIG. 3 illustrates a diagram showing which incomplete paths taken by different users at a travel destination may be merged, in accordance with various embodiments.

FIG. 3 illustrates a diagram showing determining whether incomplete paths at two different travel destinations may be merged. Two incomplete paths, or fragments thereof, may be merged by leveraging path quality information. For instance, two questions may arise when contemplating whether to merge two different incomplete paths—(1) how to decide whether the two incomplete paths could be merged together and (2) how to merge the two incomplete paths together. Three examples of incomplete paths that are expected to be merged are illustrated in FIG. 3.

More particularly, at travel destination 302, two incomplete paths 304 and 306 have been generated based on geo-tagged photographs 114 taken and uploaded by two different tourists. Based on incomplete paths 304 and 306, the incomplete paths have been successfully merged to reconstruct a travel path 308 (dashed line). Furthermore, incomplete paths may not be merged if the directions of the incomplete paths are different. For example, incomplete paths 312 and 314 at travel destination 310 are not expected to be merged as the directions of incomplete paths 312 and 314 do not agree with one another. For instance, based on the incomplete paths 312 and 314, it is likely that the tourists associated with incomplete paths 312 and 314 traveled on two different paths that appear to be about perpendicular with each other. Accordingly, since it is unlikely that these tourists traveled along the same path within travel destination 310, the incomplete paths 312 and 314 would not be merged and, therefore, a travel path would not be reconstructed.

Furthermore, two different incomplete paths may not be merged if there is too great of a distance between the incomplete paths associated with each tourist. The above distance refers to a distance between the closest photographs, or photograph pairs (anchor photographs), associated with a first tourist and a second tourist. A twofold GPS locating error, which can be set to any distance (i.e., 20 meters), may be used as a threshold to prevent pairs of incomplete paths with too large of a distance from merging. For instance, with respect to travel destination 316, the distance between the closest photographs associated with incomplete path 318 and incomplete path 320 may be too large to merge the two incomplete paths. Therefore, it is unlikely that the tourists associated with incomplete paths 318 and 320 traveled along the same path within travel destination 316.

In addition, as multiple geo-tagged photographs 114 may be associated with a single incomplete path, that incomplete path may contain multiple fragments. As stated above, fragments of an incomplete path refer to a portion of the incomplete path between two geo-tagged photographs 114 associated with that incomplete path. In relation to FIG. 3, provided that incomplete path 304 and incomplete path 306 each have multiple geo-tagged photographs 114 associated with them, each incomplete path would have multiple fragments. Thus, there would be multiple ways to merge the fragments of incomplete paths 304 and 306. To determine which merged result is the most likely travel path 308, the qualities of the merged paths are calculated using equation (8) and the merged path with the highest score is selected as the merging result, which in this case would be travel path 308.

Once the one or more merged travel paths are identified as candidates using equations (8) and (9), the one or more merged travel paths may be ranked to obtain the most representative merged travel paths. In an example embodiment, given N incomplete paths $f_1, f_2, \ldots, f_N$, or fragments thereof, in a particular travel destination, the candidate merged travel paths may be obtained by merging these incomplete paths together utilizing algorithm (5). One way of accomplishing this is to select each incomplete path as the target incomplete path, and then merge the other incomplete paths with the selected incomplete path by using the aforementioned fragment merging method. In each merging step, the output merged travel path may be used to update the target incomplete path. Thus, by considering each of the N incomplete paths within a travel destination as a target incomplete path, no more than N incomplete paths could be generated, out of which duplicate ones could be removed.

In various embodiments, in order to obtain the most representative travel paths within a travel destination, all candidate merged travel paths may be ranked according to their path score s(r) and the top rated ones could be selected as the travel path(s) in that corresponding travel destination.

Figure 4:
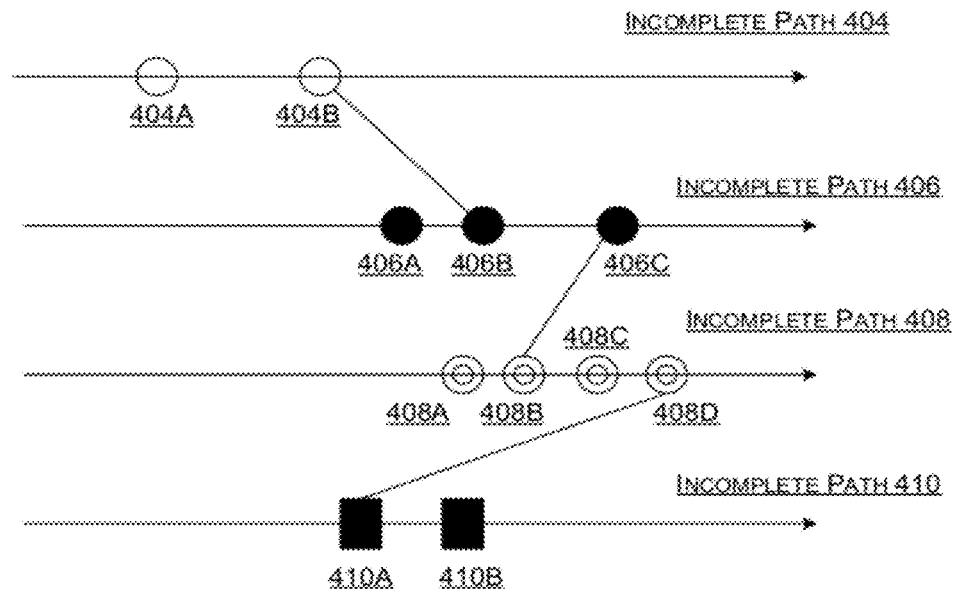
FIG. 4 illustrates a diagram showing merging geo-tagged photographs taken by multiple users at the same travel destination into a single timeline, in accordance with various embodiments.
Figure 4:
Figure 4:
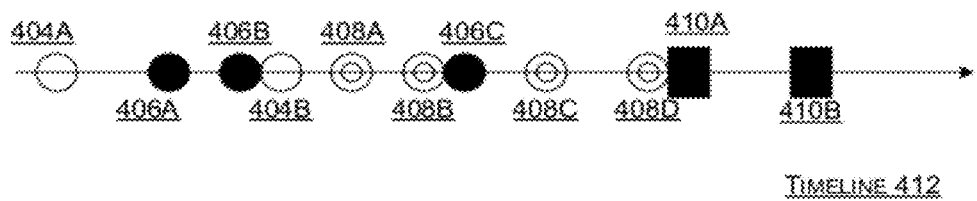

FIG. 4 illustrates a diagram showing combining a plurality of incomplete paths into a single timeline to determine a stay time within a particular travel destination. As shown, FIG. 4 illustrates travel destination 402, which includes incomplete paths 404, 406, 408, and 410 associated with four different tourists. As stated previously, each incomplete path represents a path corresponding to geo-tagged photographs 114 taken by a particular tourist within travel destination 402 that are subsequently uploaded. For instance, photographs 404A and 404B correspond to incomplete path 404, photographs 406A, 406B, and 406C are associated with incomplete path 406, photographs 408A, 408B, 408C, and 408D correspond to incomplete path 408, and photographs 410A and 410B are associated with incomplete path 410. In this embodiment, each of the geo-tagged photographs 114 is taken at different times along the four incomplete paths. Therefore, each of the incomplete paths follows a different timeline. After determining a timeline for each incomplete path, each incomplete path within travel destination 402 may be plotted along a single timeline 412.

Utilizing the timeline 412 set forth in FIG. 4, the typical stay time in a travel destination, such as travel destination 402, may be determined. As stated above, incomplete paths 404, 406, 408, and 410 may possibly have different timelines but can be merged into a single timeline 412. For example, photographs taken in the same position, such as photographs taken of a particular sight within travel destination 402, by different tourists (or anchor photographs) might be taken at different times. As shown in FIG. 4, photographs 404B and 406B, photographs 406C and 408B, and photographs 408D and 410A are anchor photos, which are represented by being connected via lines. However, it appears that each of these pairs of photographs was taken by different tourists at different times. Therefore, in order to get the proper time span of a merged travel path, the timelines of all incomplete paths contributing to the merged travel path should be aligned to make the anchor photographs of two incomplete paths have the same time. Based on this common timeline 412, the time span of all photographs related to this merged travel path are used as the discovered stay time of this travel path.

For example, and as illustrated in FIG. 4, four incomplete paths with different timelines are merged into a more complete path with a common timeline. Therefore, the travel path discovered by the foregoing algorithm is more complete based on which stay time is estimated. That is, by aligning each incomplete path on a single timeline 412, the time spent within a travel destination (i.e., travel destination 402) for each tourist may be determined. As the stay times for each tourist may be different, stay times for a particular attraction and/or travel destination may be recommended based on the amount of time user 102 has available for visiting that attraction/travel destination.

In various embodiments, based on statistical analysis of stay times, a stay time distribution could be obtained for each travel destination. Moreover, for each possible stay time within a particular travel destination, a list of typical internal paths within that travel destination may be determined. Such information would allow user 102 to determine how much time to spend within a particular travel destination and then select an internal path within that travel destination that is consistent with that particular stay time. Alternatively, user 102 may also select an internal path of interest within a travel destination and then identify how long tourists typically spend traversing that internal path.

Additionally, it is contemplated that time cost of a particular trip consists of two different parts—(1) stay time within all of the travel destinations along the trip, as discussed above and (2) passing time between each of the travel destinations. In other words, the passing time refers to the amount of time spent traveling between each travel destination and/or the total amount of time spent traveling between all of the travel destinations during the trip. It is contemplated that the passing time could be obtained using the same methods explained above relating to stay time.

Figure 5:
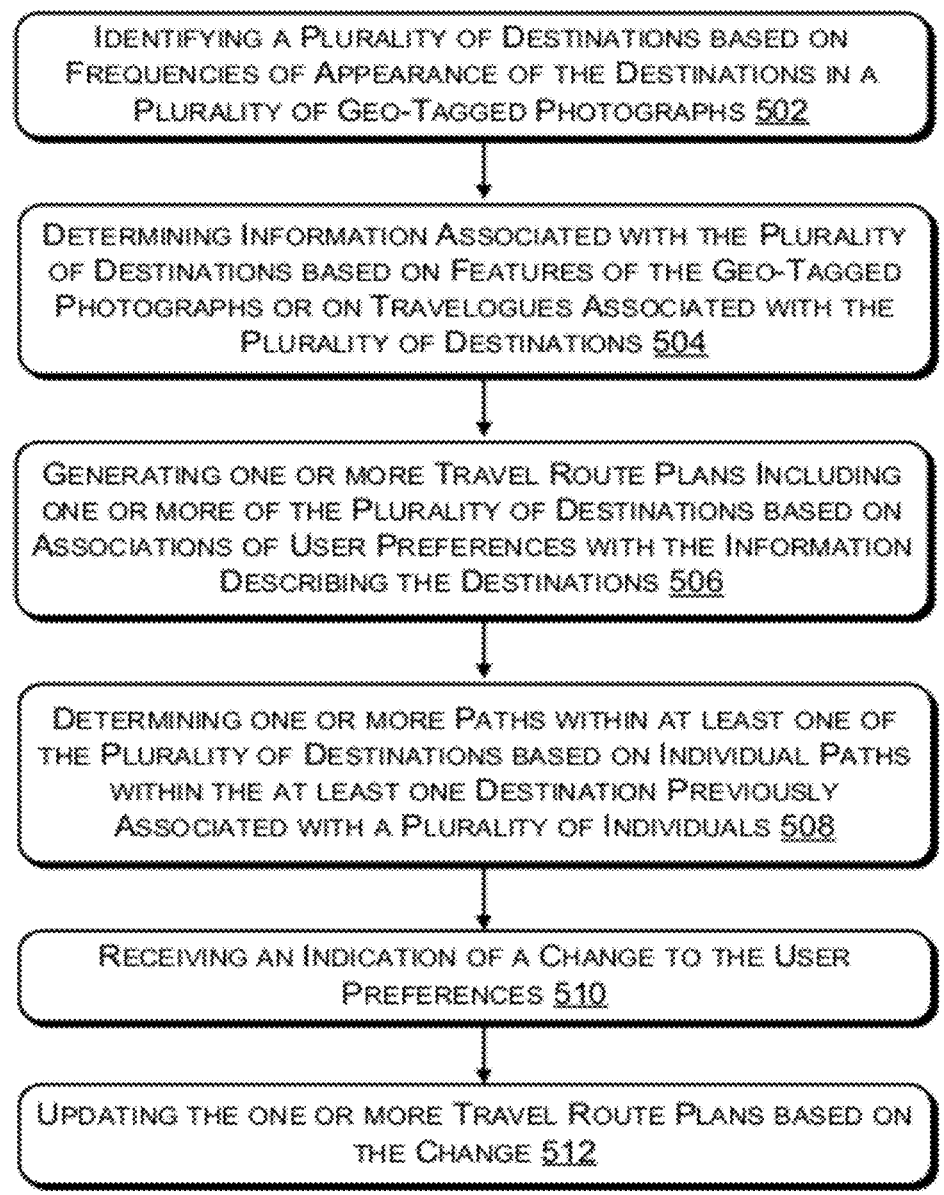
FIG. 5 illustrates a flowchart showing the generating of one or more travel routes between a plurality of travel destinations, in accordance with various embodiments.
Figure 6:
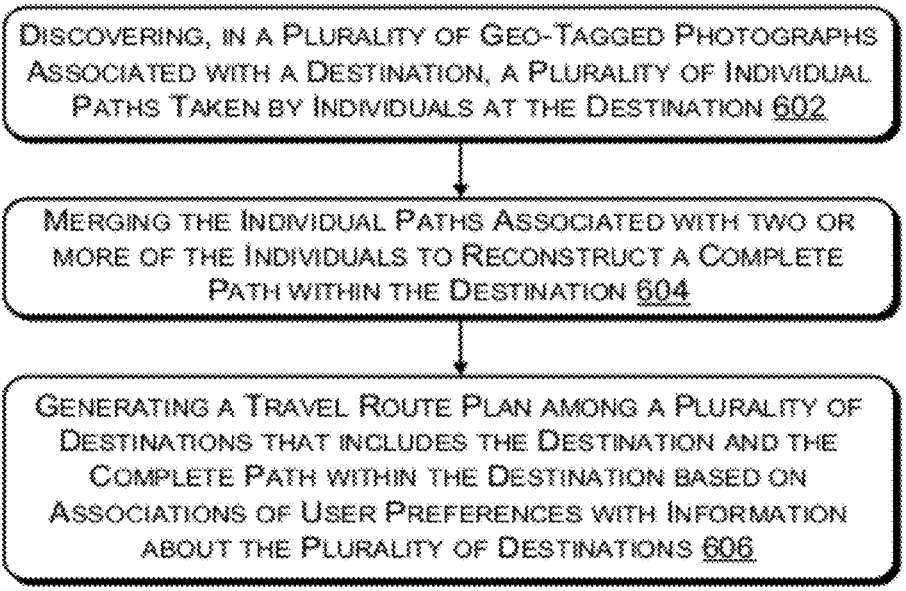
FIG. 6 illustrates a flowchart showing the reconstructing of a complete path within a destination based on individual paths previously taken in that destination, in accordance with various embodiments.

FIGS. 5 and 6 describe various example systems and/or processes for providing a customized trip plan to a user. The example processes are described in the context of the environment of FIGS. 1-4, but are not limited to those environments. The order in which the operations are described in each example process is not intended to be construed as a limitation, and any number of the described blocks can be combined in any order and/or in parallel to implement each process. Moreover, the blocks in the FIGS. 5 and 6 may be operations that can be implemented in hardware, software, and a combination thereof. In the context of software, the blocks represent computer-executable instructions that, when executed by one or more processors, cause one or more processors to perform the recited operations. Generally, the computer-executable instructions may include routines, programs, objects, components, data structures, and the like that cause the particular functions to be performed or particular abstract data types to be implemented.

FIG. 5 is a flowchart illustrating a method of identifying a plurality of destinations based on a plurality of geo-tagged photographs. More particularly, block 502 illustrates identifying a plurality of destinations based on frequencies of appearance of the destinations in a plurality of geo-tagged photographs. As mentioned above, the geo-tagged photographs may refer to geo-tagged photographs 114 and the destinations may be any travel destinations, sights, attractions, cities, and/or regions throughout the world. In various embodiments, destinations that appear more frequently in the plurality of geo-tagged photographs 114 may be deemed to be more popular or more commonly traveled destinations. Therefore, such destinations may be of greater interest to a user 102.

Block 504 illustrates determining information associated with the plurality of destinations based on features of the geo-tagged photographs or on travelogues associated with the plurality of destinations. In an example embodiment, the travelogues set forth above may refer to travelogues 116. That is, characteristics and/or information relating to a particular destination may be determined by one or more geo-tagged photographs. That is, for a geo-tagged photograph 114 illustrating a beach with palm trees, it may be determined that the destination illustrated in that geo-tagged photograph 114 is tropical and is near a body of water. Similarly, an exact location of the destination may be determined by accessing information encoded in the geo-tagged photograph 114, such as a latitude/longitude pair. Moreover, characteristics relating to the destination may also be determined by reading one or more travelogues 116 associated with that destination. Such travelogues 116 may describe the destination in sufficient detail so that characteristics associated with that destination, such as the weather, attractions, and/or the types of food typically eaten at that destination, for example, may be determined.

Block 506 illustrates generating one or more travel route plans including one or more of the plurality of destinations based on associations of user preferences with the information describing the destinations. The user preferences may be any information associated with a user 102 that would be contemplated by one or ordinary skill in the art, such as, for example, travel duration, visiting time at each destination, destination preference, monetary budget limitations, travel preferences, travel location, and/or a season of travel. In various embodiments, the travel route plans may include a recommended route between or among a plurality of destinations. Such destinations may be determined based on preferences of a particular user 102. For instance, a user 102 who enjoys coffee, seafood, mountains, and milder temperatures during the summer may be provided with a travel route plan for various attractions in Seattle, Wash. In other words, the travel route plan(s) provided to a user 102 may include destinations that have characteristics that are consistent with preferences specified by that user 102.

Block 508 illustrates determining one or more paths within at least one of the plurality of destinations based on individual paths within the at least one destination previously associated with a plurality of individuals. In one embodiment, the individual paths may be determined based on geo-tagged photographs 114 taken by each of the plurality of individuals while those individuals were visiting the at least one destination. For instance, based on a time and location of each of the geo-tagged photographs 114, a path corresponding to at least a portion of the at least one destination for each of the individuals may be constructed. In another embodiment, the one or more paths described above may be determined by determining a time in which each of the geo-tagged photographs 114 was taken, aligning each of the geo-tagged photographs 114 taken at the at least one destination along a timeline based on the time each geo-tagged photograph 114 was taken, and using the timeline to merge the individual paths corresponding to the individuals into a recommended path for user 102. In addition, the timeline may also be used to determine a recommended stay or visiting time within the at least one destination. That is, since different tourists are likely to take photographs of the same attraction within a travel destination at different times along their corresponding paths, by aligning the geo-tagged photographs 114, the stay time within a travel destination for each tourist may be determined.

In another embodiment, a plurality of individuals may have each taken one or more geo-tagged photographs 114 while visiting a particular destination. A time in which each of these geo-tagged photographs 114 was taken may be determined. For each individual, based on the time each geo-tagged photograph 114 was taken at the destination, an individual path taken by the individual can then be determined. Subsequently, the individual paths associated with each of the plurality of individuals may be merged to generate a complete path within the destination. Since the plurality of individuals may have each taken different individual paths while visiting the destination, it is contemplated that the individual paths may be merged to form multiple complete paths within that destination. Once the complete paths are identified, they can each be ranked according to any factor known in the art. For instance, the rankings may reflect the most direct complete path through the destination and/or the complete path that passes the most popular attractions within the destination. The complete paths may then be recommended to a user 102 based on preferences associated with the user 102. For instance, if a user 102 intends to spend two hours within the destination, a complete path that should take approximately two hours may be recommended. Similarly, the recommended path may be selected based on attractions the user 102 desires to see while visiting the destination.

Moreover, a stay time distribution may be determined based on all, or some, of the complete paths within one destination. The stay time distribution may reflect the amount of time each individual stayed at that destination. Accordingly, the most popular stay time within that destination may be recommended to a user 102. Further, any other stay time that corresponds with the user's 102 preferences may also be recommended.

Block 510 illustrates receiving an indication of a change to the user preferences. For instance, a user 102 may decide to add, remove, or update a user preference, such as travel duration or destination preference. Block 512 illustrates updating the one or more travel route plans based on the change. In an example embodiment, upon receiving a change to the user preferences, a revised travel route plan may be provided to user 102. The initial travel route plan may be revised to reflect the changes made by user 102 so that user 102 is provided with an up to date customized travel route plan.

FIG. 6 is a flowchart illustrating determining a complete path within a travel destination based on a plurality of individual paths. Block 602 illustrates discovering, in a plurality of geo-tagged photographs associated with a destination, a plurality of individual paths taken by individuals at the destination. In one embodiment, the individual paths may be determined based on the behavior of other tourists who have previously visited the travel destination. For instance, the individual paths may be generated by determining a time and location of each geo-tagged photograph 114 taken by a particular user within the destination. From the time and location of these geo-tagged photographs 114, a path taken by this user within the destination may be determined. In another embodiment, the geo-tagged photographs 114 may include a first set of geo-tagged photographs 114 taken at the destination by a first individual and a second set of geo-tagged photographs 114 taken at the destination by a second individual. The first set and second set of geo-tagged photographs 114 may relate to photographs taken by two different tourists while visiting that particular travel destination.

Block 604 illustrates merging the individual paths associated with two or more of the individuals to reconstruct a complete path within the destination. The individual paths may be merged to reconstruct a path within the destination that can be recommended to user 102 if and when that user 102 visits that particular destination. In the foregoing embodiment, the individual paths may be merged by first identifying a time and location for each of the first set of geo-tagged photographs 114 and the second set of geo-tagged photographs 114 to generate incomplete paths taken by the first individual and the second individual. As stated previously, such paths may be incomplete if either the first individual or the second individual only took photographs during a portion of their visit to the destination. Since the individual paths generated for the first user and/or the second user may be incomplete, a typical travel path taken by tourists who previously visited a particular travel destination may be determined by merging the two paths. However, as described above with respect to FIG. 3, some paths may be merged to form a typical travel path whereas others may not. Subsequently, the incomplete paths of the first individual and the second individual may be merged to reconstruct the complete path.

Block 606 illustrates generating a travel route plan among a plurality of destinations that includes the destination and the complete path within the destination based on associations of user preferences with information about the plurality of destinations. For instance, the destinations may be selected based on a comparison between characteristics associated with those destinations and user preferences known about user 102. In addition, the travel route plan provided to user 102 may include a visiting order of the plurality of destinations, a time arrangement for each destination, and the typical travel path within each destination. In other words, the travel route plan may include recommendations relating to which sequence the destinations should be visited, how much time should be spent within each destination, and a recommended path within each travel destination.

Figure 7:
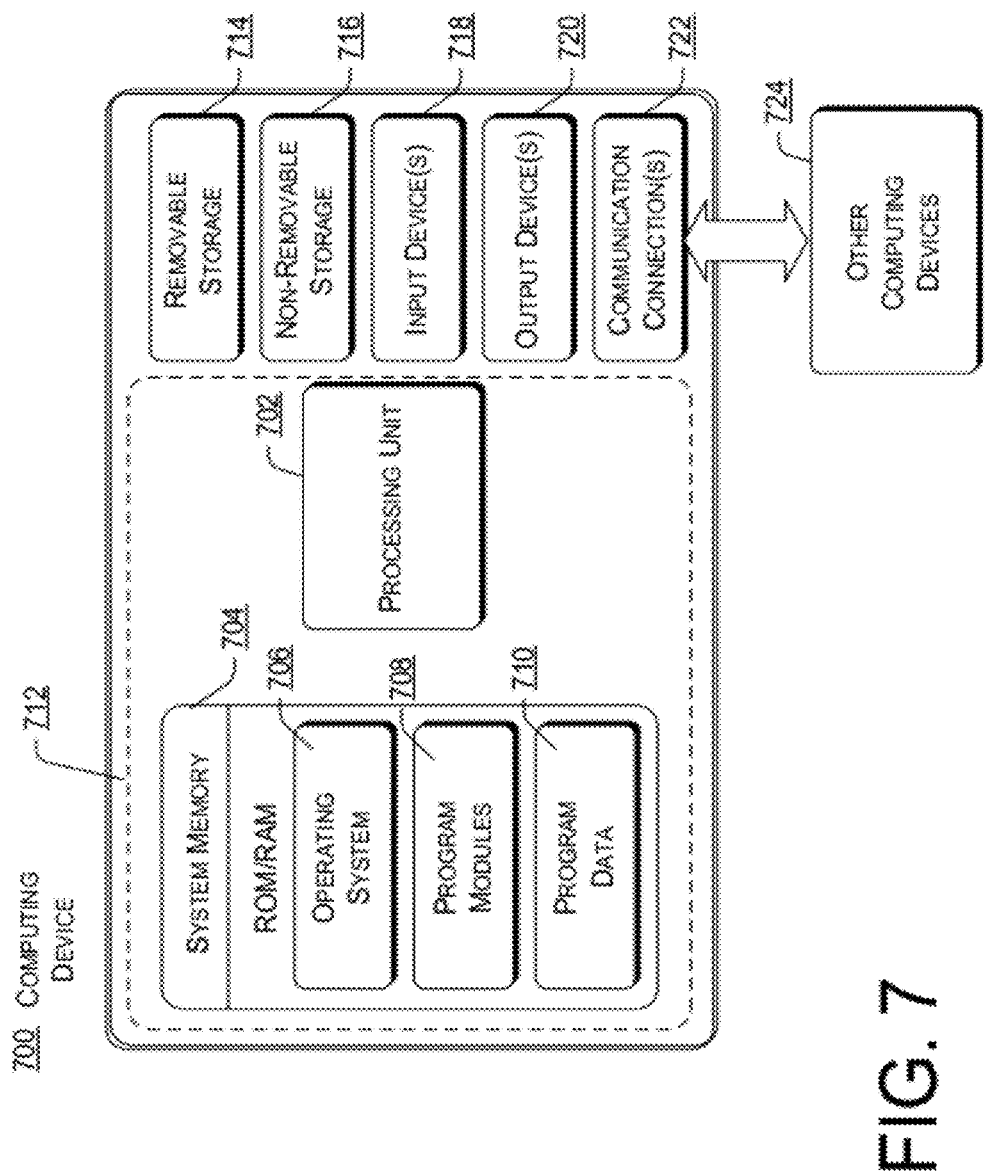
FIG. 7 is a block diagram that illustrates a representative computing device that may implement the travel planning techniques described herein, in accordance with various embodiments.

FIG. 7 illustrates a representative computing device 700 that may implement the trip planning methods described herein, in accordance with various embodiments. The techniques and mechanisms described herein may be implemented by computing device 700 as well as by any other computing device, system, and/or environment. The computing device 700 shown in FIG. 7 is only one example of a computing device and is not intended to suggest any limitation as to the scope of use or functionality of any computing device utilized to perform the processes and/or procedures described above.

In at least one configuration, computing device 700 includes at least one processing unit 702 and system memory 704. Processing unit 702 may execute one or more modules and/or processes to cause computing device 700 to perform a variety of functions. In some embodiments, the processing unit 702 is a central processing unit (CPU), a graphics processing unit (GPU), both CPU and GPU, or other processing units or components known in the art.

Depending on the exact configuration and type of computing device, system memory 704 may be volatile (such as RAM), non-volatile (such as ROM, flash memory, miniature hard drive, memory card, or the like) or some combination thereof. System memory 704 may include an operating system 706, one or more program modules 708, and may include program data 710. The computing device 700 is of a very basic configuration demarcated by a dashed line 712. Again, a terminal may have fewer components but may interact with a computing device that may have such a basic configuration.

Computing device 700 may have additional features and/or functionality. For example, computing device 700 may also include additional data storage devices (removable and/or non-removable) such as, for example, magnetic disks, optical disks, or tape. Such additional storage is illustrated in FIG. 7 by removable storage 714 and non-removable storage 716. Computer storage media may include volatile and nonvolatile, removable, and non-removable media implemented in any method or technology for storage of information, such as computer readable instructions, data structures, program modules, or other data. System memory 704, removable storage 714 and non-removable storage 716 are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other medium which can be used to store the desired information and which can be accessed by computing device 700. Any such computer storage media may be part of computing device 700. Computing device 700 may also have input device(s) 718 such as a keyboard, a mouse, a pen, a voice input device, a touch input device, etc. Output device(s) 720, such as a display, speakers, a printer, etc. may also be included.

Computing device 700 may also contain communication connections 722 that allow the device to communicate with other computing devices 724, such as over a network. These networks may include wired networks as well as wireless networks. Communication connections 722 are some examples of communication media. Communication media may typically be embodied by computer readable instructions, data structures, program modules, etc.

It is appreciated that the illustrated computing device 700 is only one example of a suitable device and is not intended to suggest any limitation as to the scope of use or functionality of the various embodiments described. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The implementation and administration of a shared resource computing environment on a single computing device may enable multiple computer users to concurrently collaborate on the same computing task or share in the same computing experience without reliance on networking hardware such as, but not limited to, network interface cards, hubs, routers, servers, bridges, switches, and other components commonly associated with communications over the Internet, as well without reliance on the software applications and protocols for communication over the Internet.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A method comprising:

accessing, by a computing device, geo-tagged photographs associated with a plurality of destinations, each geo-tagged photograph of the geo-tagged photographs captured via at least one image capturing device at a destination of the plurality of destinations;

identifying, by the computing device, the plurality of destinations based on frequencies of appearance of the plurality of destinations in the geo-tagged photographs;

determining, by the computing device, information associated with the plurality of destinations based on at least one of features of the geo-tagged photographs or on travelogues associated with the plurality of destinations, the information including at least one of common travel paths between destinations of the plurality of destinations or stay times within destinations of the plurality of destinations;

generating, by the computing device and for a user, one or more travel route plans including one or more destinations of the plurality of destinations based on associations of user preferences with the information describing the plurality of destinations;

identifying, by the computing device and within a travel route plan of the one or more travel route plans, one or more paths that provide a tour of a particular destination of the one or more destinations included within the travel route plan, the one or more paths based at least in part on the common travel paths between the destinations or the stay times within the destinations;

generating, by the computing device and for the user, a personalized user interface that provides functionality for the user to access at least one of the travel route plan or the one or more paths; and providing the personalized user interface to a user device corresponding to the user.

2. The method of claim 1, further comprising:

accessing a subset of geo-tagged photographs of the plurality of geo-tagged photographs, the subset of geo-tagged photographs being associated with the particular destination;

determining a time in which each geo-tagged photograph of the subset of geo-tagged photographs was captured;

utilizing the time to generate individual paths;

merging the individual paths to determine the one or more paths;

ranking the one or more paths according to a score assigned to each path; and recommending at least one path of the one or more paths.

3. The method of claim 1, wherein the plurality of destinations are identified and the one or more paths are determined based on travel-related information encoded in the plurality of geo-tagged photographs.

4. The method of claim 1, further comprising:

receiving an indication of a change to the user preferences; and updating the one or more travel route plans based on the change.

5. The method of claim 1, wherein the user preferences relate to at least one of travel duration, visiting time at each destination, destination preference, travel preferences, travel location, or a season of travel.

6. One or more computer storage hardware having computer-readable instructions that, when executed by a processor, perform operations comprising:

accessing a plurality of geo-tagged photographs associated with a destination, individual geo-tagged photographs of the plurality of geo-tagged photographs captured via at least one image capturing device at the destination;

determining, based at least in part on the plurality of geo-tagged photographs associated with the destination, a plurality of individual paths associated with a plurality of user devices corresponding to a plurality of individuals at the destination;

merging at least some individual paths of the plurality of individual paths to reconstruct a complete path within the destination;

generating a travel route associated with a plurality of destinations that includes the destination and the complete path within the destination based on associations of user preferences with information about the plurality of destinations;

generating a personalized user interface that provides functionality for a user to access the travel route; and providing the personalized user interface to a user device corresponding to the user.

7. The one or more computer storage hardware of claim 6, wherein the plurality of geo-tagged photographs include a first set of geo-tagged photographs associated with a first individual of the plurality of individuals and a second set of geo-tagged photographs associated with a second individual of the plurality of individuals.

8. The one or more computer storage hardware of claim 7, wherein the operations further comprise:

identifying a time and a location for each of the first set of geo-tagged photographs and the second set of geo-tagged photographs to generate incomplete paths traveled by a first user device of the plurality of user devices corresponding to the first individual and a second user device of the plurality of user devices corresponding to the second individual; and merging the incomplete paths to reconstruct the complete path.

9. The one or more computer storage hardware of claim 6, wherein the travel route includes a visiting order of the plurality of destinations, a time arrangement for individual destinations of the plurality of destinations, and a typical travel path within the individual destinations.

10. One or more computer storage hardware storing computer-executable instructions that, when executed by one or more processors, cause the one or more processors to perform operations comprising:

identifying a plurality of destinations based at least in part on frequencies of appearance of the plurality of destinations in a plurality of geo-tagged photographs, individual geo-tagged photographs of the plurality of geo-tagged photographs captured via at least one image capturing device at corresponding individual destinations of the plurality of destinations;

determining information associated with the plurality of destinations based on features of the plurality of geo-tagged photographs or on a plurality of travelogues associated with the plurality of destinations, the information including at least one of common travel paths between destinations of the plurality of destinations or stay times within destinations of the plurality of destinations;

generating one or more travel route plans including one or more destinations of the plurality of destinations based on associations of user preferences with the information associated with the plurality of destinations;

identifying, within a travel route plan of the one or more travel route plans, one or more paths that provide a tour of a particular one of the one or more destinations within the travel route plan, the one or more paths based at least in part on the common travel paths between the destinations or the stay times within the destinations;

generating a personalized user interface that provides functionality for a user to access at least one of the travel route plan or the one or more paths; and providing the personalized user interface to a user device corresponding to the user.

11. The one or more computer storage hardware of claim 10, wherein the operations further comprise determining the one or more paths based on individual paths within the particular one of the one or more destinations previously associated with a plurality of individuals, the individual paths being determined based on geo-tagged photographs captured by user devices corresponding to individual ones of the plurality of individuals while visiting the particular one of the one or more destinations.

12. The one or more computer storage hardware of claim 11, wherein the operations further comprise:

determining a time in which individual ones of the geo-tagged photographs at the particular one of the one or more destinations were captured; and utilizing the time in which the individual ones of the geo-tagged photographs were captured to generate the individual paths.

13. The one or more computer storage hardware of claim 11, wherein the operations further comprise merging a first path and a second path of the individual paths to determine a path of the one or more paths.

14. The one or more computer storage hardware of claim 10, wherein the operations further comprise:

ranking the one or more paths according to a score assigned to individual paths of the one or more paths; and recommending at least one path of the one or more paths.

15. The one or more computer storage hardware of claim 10, wherein the plurality of destinations are identified and the one or more paths are determined based on travel-related information encoded in the plurality of geo-tagged photographs.

16. The one or more computer storage hardware of claim 10, wherein the operations further comprise:

receiving an indication of a change to the user preferences; and updating the one or more travel route plans based on the change.

17. The one or more computer storage hardware of claim 10, wherein the user preferences relate to at least one of travel duration, visiting time at individual ones of the plurality of destinations, destination preference, travel preferences, travel location, or a season of travel.

18. The one or more computer storage hardware of claim 6, wherein the operations further comprise:

determining a path quality associated with individual paths of the at least some individual paths, the path quality representing a degree to which the individual paths approach an ideal path associated with the destination, wherein the ideal path comprises a path having a photo density above a predetermined threshold;

determining a path popularity associated with the individual paths, the path popularity representing a number of the plurality of the user devices that have traveled along the individual paths; and merging the at least some individual paths to reconstruct the complete path within the destination is based at least in part on the path quality and the path popularity.

19. The one or more computer storage hardware of claim 6, wherein the user preferences relate to at least one of travel duration, visiting time at each destination, destination preference, travel preferences, travel location, or a season of travel.

20. The method of claim 1, wherein identifying the plurality of destinations is further based at least in part on:

determining a first group of geo-tagged photographs that are associated with a first destination;

determining a second group of geo-tagged photographs that are associated with a second destination;

determining that the first group includes more geo-tagged photographs than the second group; and selecting the first destination as a destination to include in the plurality of destinations.

* * * * *